R. T. EASLEY.
WAGON BRAKE.
APPLICATION FILED JULY 18, 1917.
1,314,469.
Patented Aug. 26, 1919.
2 SHEETS—SHEET 1.
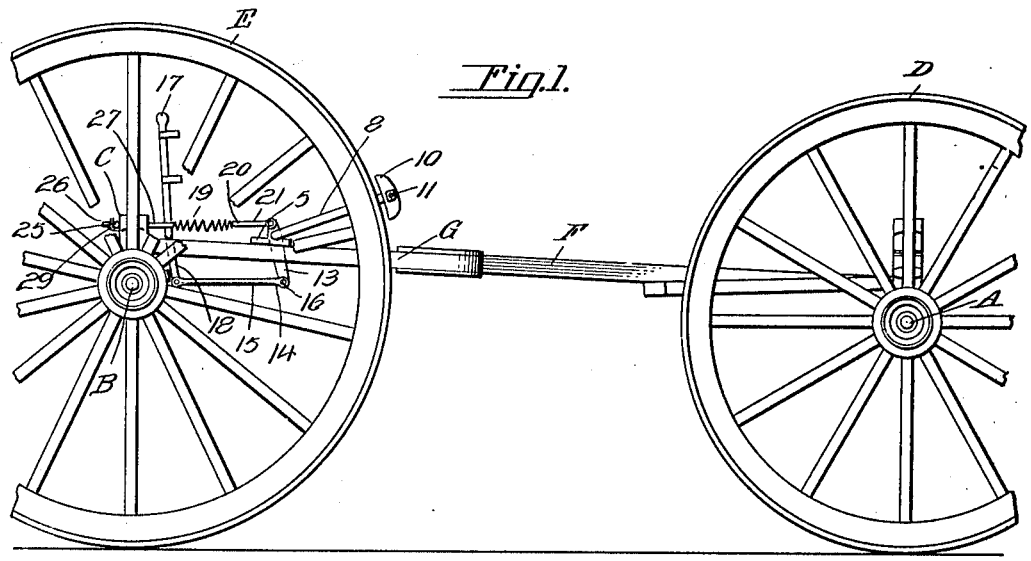
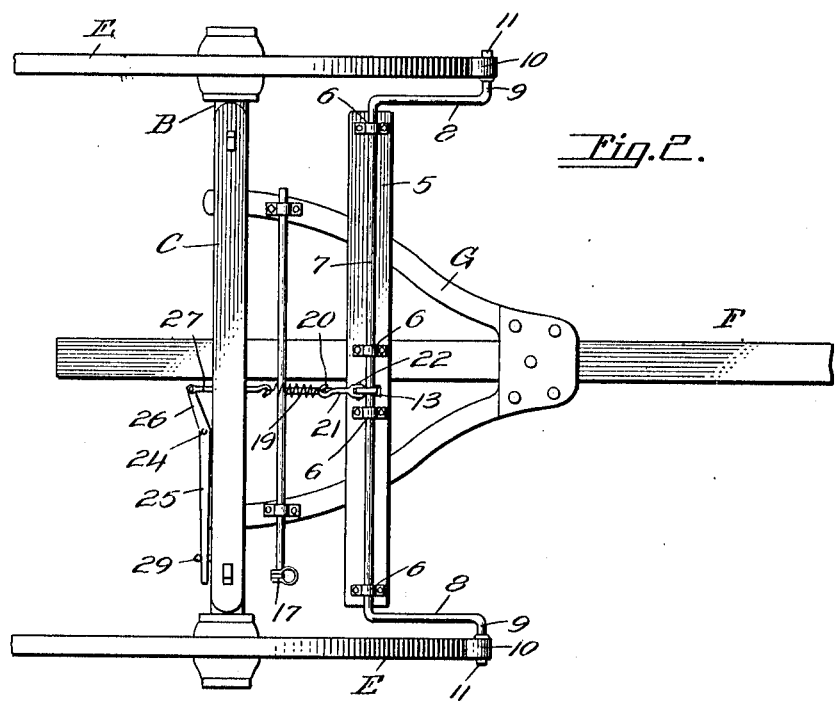
WITNESSES
INVENTOR
Raleigh T. Easley.
BY Victor J. Evans
ATTORNEY R. T. EASLEY.
WAGON BRAKE.
APPLICATION FILED JULY 18, 1917.
1,314,469.
Patented Aug. 26, 1919.
2 SHEETS—SHEET 2.
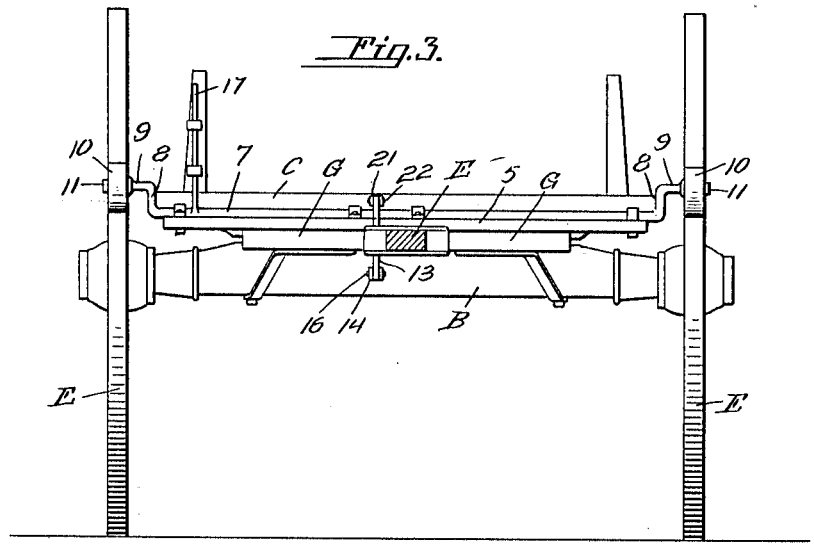
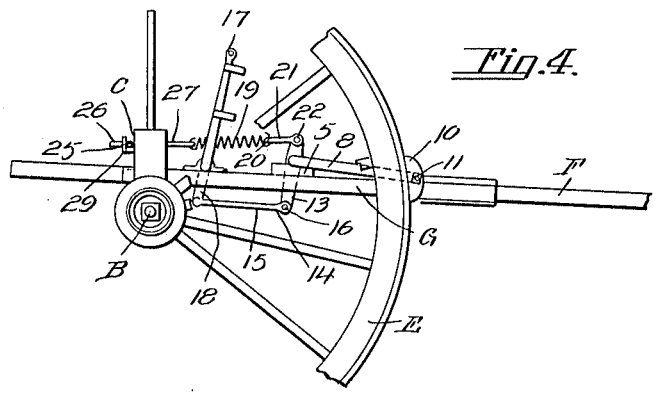
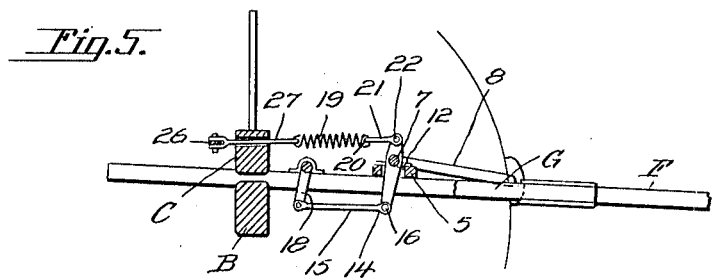
WITNESSES
INVENTOR
*Raleigh T. Easley.*
BY *Victor J. Evans*
ATTORNEY

UNITED STATES PATENT OFFICE.

RALEIGH THOMAS EASLEY, OF TIPLERSVILLE, MISSISSIPPI.

WAGON-BRAKE.

1,314,469.  Specification of Letters Patent.  Patented Aug. 26, 1919.

Application filed July 18, 1917. Serial No. 181,356.

*To all whom it may concern:*

Be it known that I, RALEIGH THOMAS EASLEY, a citizen of the United States, residing at Tiplersville, in the county of Tippah and State of Mississippi, have invented new and useful Improvements in Wagon-Brakes, of which the following is a specification.

The present invention relates to vehicle brakes, and more particularly to that class thereunder known as wagon brakes.

One of the objects of the invention resides in the production of a brake of the above stated character wherein means are employed for manually operating the brakes, whereby when the vehicle is descending a hill and the same runs on to the animals, the brakes may be set to facilitate an automatic locking of the wheels.

Furthermore, I contemplate the provision of a brake of this character, wherein the construction thereof is novel in form, permitting the application thereof to a vehicle without any changing or alteration in its usual construction, and the brakes will be successfully operated when the occasion so requires.

A further object of the invention is the provision of a brake of this character which is extremely simple in construction, durable and efficient in use, strong and inexpensive in the manufacture and installation.

With the above and other objects in view, the invention consists in the novel features, details of construction and combination of parts which will hereinafter be more fully set forth, illustrated in the accompanying drawings and pointed out in the appended claims.

Figure 1 is a side elevation of a wagon showing the brakes constructed in accordance with the invention applied;

Fig. 2 is a top plan view with the body of the wagon removed therefrom;

Fig. 3 is a front elevation;

Fig. 4 is a view similar to Fig. 2 illustrating the automatic locking of the brake shoes with the wheels; and Fig. 5 is a vertical longitudinal sectional view.

Referring to the drawings in detail, A and B designate respectively the front and rear axles which support bolsters C, and D and E are the front and rear wheels which are journaled upon the spindles of the axles as usual, while the reach pole F is secured to the rear bolster C and braced by the hounds G, all of which are of the ordinary and suitable construction of vehicle.

5 denotes a cross beam which supports the brake levers and brake mechanism to be hereinafter referred to.

The cross beam in this particular instance is supported upon the braces and reach pole, and provided with suitable spaced bearings 6 for supporting the brake hanger 7 thereon for rocking movement, and this hanger is terminally provided with L-shaped arms 8, on the threaded horizontal portion 9 of which is fixedly secured brake shoes 10 through the medium of a suitable fastening device 11 threadedly connected to the horizontal portions 9 of said arms. The character 13 denotes a link which operates in a transfer slot 12, and this link has its lower end pivotally connected in the forked end 14 of the brake operating rod 15 through the medium of a pin 16. Journaled for rocking movement upon the hound is a manually controlled lever 17 arranged in convenient reach of the driver of the vehicle, and operatively connected with the brake hanger by the pivotal connection of the lug 18 with the forward end of the brake operating rod 15. At this point, it is to be noted that the mounting of the hanger with relation to the rear wheels of the vehicle positions the shoes above the horizontal center of the wheels.

The arms 8 of the brake hanger are moved to a released position automatically through the employment of a coiled spring 19 connected at one end in the hooked extremity 20 of the hook 21, and said hook is pivotally connected to the upper extremity of the link 13 by a pin 22 traversing the fork-shaped end 23 of the hook and projecting through the upper end of the link 13. Pivotally mounted on the bolster as at 24 is a manually controlled means for setting the brakes to facilitate an automatic or manual operation thereof. To this end, I provide a lever 25 pivotally mounted on the bolster for horizontal swinging movement, provided at its forward end with an outwardly inclined shank 26 having pivotally connected at its free end a hook member 27 similar to the hook carried by the brake hanger, and in the free end thereof is connected the opposite end of the coiled spring 19. This second or latter referred to hook member operates in a transverse slot 28 formed in the bolster and operating in a longitudinal plane with the reach pole. The hand gripping portion of the lever 25 is engaged with a keeper 29 on said bolster, consequently tensioning the hanger and facilitating the throwing of the brakes automatically to a released position.

Upon descending a hill, and it is necessary that the brakes be firmly applied to the periphery of the wheel D, the operator releases the lever 25 from its keeper 29, permitting the brake shoes 10 to drop in contact with the periphery of the wheels. Further, the spring 19 serving as a flexible connection, during this operation of the brake, facilitates the shoes to gradually bind or lock with the periphery of the wheel.

From the foregoing description, taken in connection with the accompanying drawings, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:—

1. In a vehicle brake, the combination with a slotted cross beam, of a brake hanger journaled upon the brake beam for rocking movement, a link carried by the brake hanger and working in the slot of the beam, an operating rod pivotally connected to the lower end of the link, a manually controlled rock shaft, means for pivotally connecting the opposite end of the operating rod to said shaft, and a brake setting device pivotally connected to one of the vehicle bolsters and having connection with the opposite end of said link, and a spring having connection with the brake setting device and said hanger.

2. A vehicle brake embodying a brake hanger mounted for horizontal rocking movement, brake shoes carried by the hanger, means for manually operating the brake shoes in one direction, a brake setting lever, a spring connected with the brake setting lever and the brake hanger, and means connected with the brake setting means to permit of the brakes being thrown into locked position by the engagement of the vehicle wheels therewith.

3. In a vehicle brake, the combination with a reach bar and a bolster, of a brake hanger mounted upon the reach bar for horizontal rocking movement, a manually controlled rock shaft, an operating rod connecting the brake hanger with said rock shaft, a lever pivotally connected to the vehicle bolster, a member pivotally connected to the free extremity of said lever and operating in a slot of the bolster, and a spring connected at one end to said member and at its opposite end to the brake hanger.

In testimony whereof I affix my signature.

RALEIGH THOMAS EASLEY.

Copies of this patent may be obtained for five cents each, by addressing the "Commissioner of Patents, Washington, D. C."